March 22, 1966  H. S. COLBY  3,241,651
CARTON DIVERTING APPARATUS
Filed March 4, 1964  2 Sheets-Sheet 2

United States Patent Office 3,241,651
Patented Mar. 22, 1966

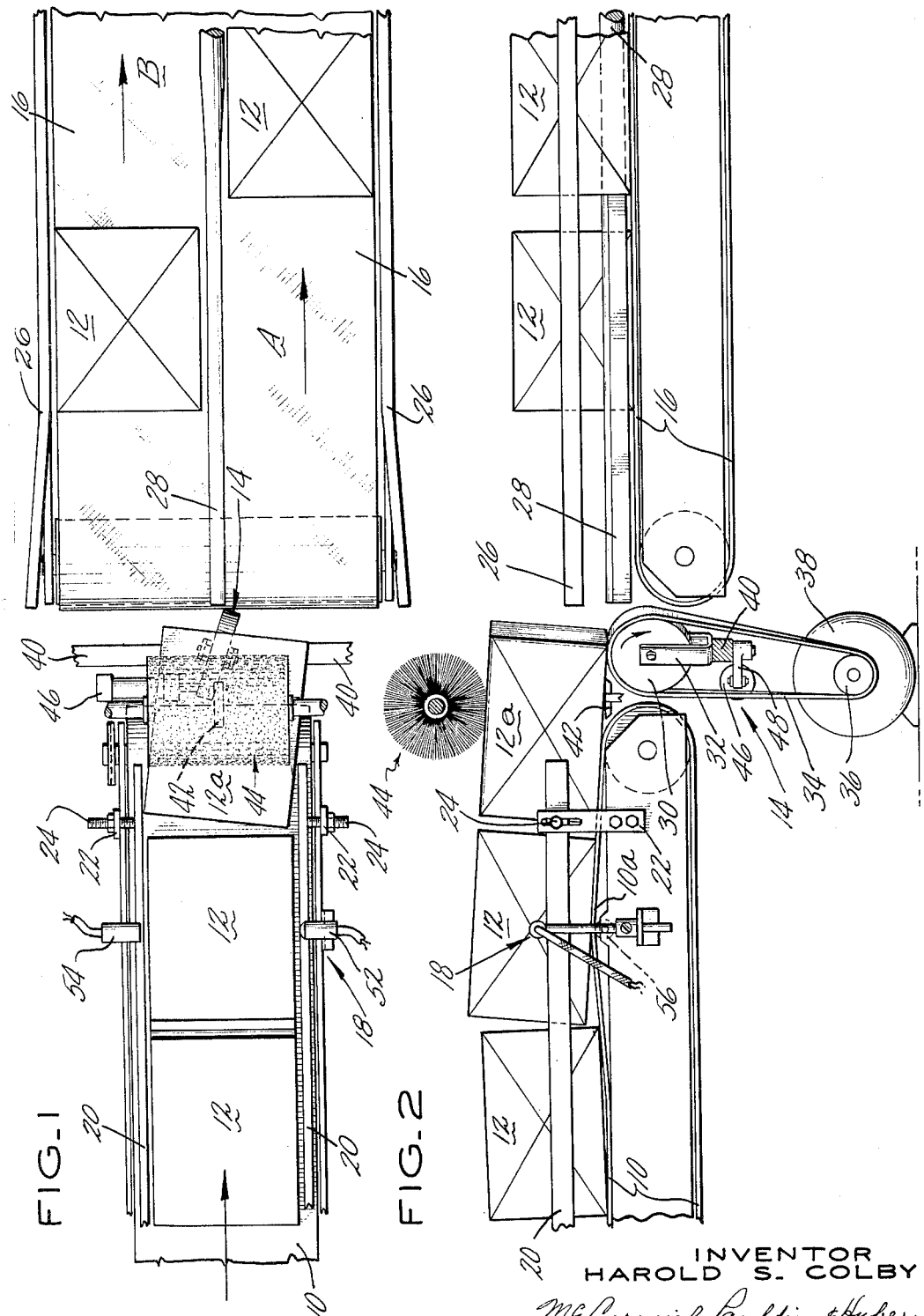

3,241,651
CARTON DIVERTING APPARATUS
Harold S. Colby, Bloomfield, Conn., assignor to Emhart Corporation, a corporation of Connecticut
Filed Mar. 4, 1964, Ser. No. 349,328
8 Claims. (Cl. 198—31)

The present invention relates to apparatus for diverting cartons into one of a plurality of lanes and deals more particularly with an apparatus for diverting predetermined numbers of cartons into each of said lanes.

The general object of the present invention is to provide an apparatus for selectively diverting cartons from a single lane into a plurality of lanes.

A more specific object of the present invention is to provide an apparatus for selectively diverting cartons from a single lane delivery conveyor wherein the cartons are arranged in end-toward-end relationship onto a take away conveyor into a plurality of lanes, each one of which is fed a predetermined number of such cartons in accordance with a given schedule.

The drawings show a preferred embodiment of the invention and such embodiment will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a plan view of a carton diverting apparatus of the present invention;

FIG. 2 is a side view of the FIG. 1 apparatus;

Figure 3:
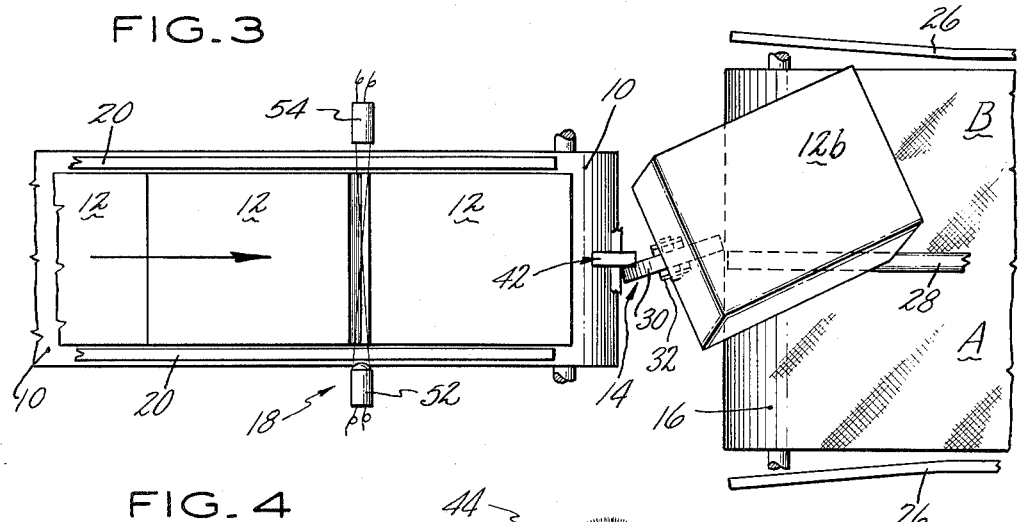
FIG. 3 is a somewhat schematic plan view of the FIG. 1 apparatus at a slightly later time.

Referring now to the drawings in greater detail, FIGS. 1 and 2 show a delivery means 10 on which a plurality of articles or cartons 12, 12 are conveyed single file towards the right in generally end-toward-end relationship. At the right hand or downstream end of the delivery means 10 there is provided suitable means 14 for diverting each carton into one of two lanes on a take-away conveyor 16.

The carton delivery means 10 comprises a generally horizontal conveyor of well known construction and need not be described herein. Carton detecting means, indicated generally at 18, is mounted on the delivery conveyor 10 and will be described in greater detail hereinbelow. Guide rails 20, 20 are mounted on brackets 22, 22 provided therefor on the delivery conveyor 10 and these are adjustable both horizontally and vertically by use of the mounting bolts 24, 24. Preferably and as shown, the guide rails 20, 20 are so spaced from one another as to allow the downstream carton 12a to turn through a slight angle as shown in FIG. 1.

Figure 4:
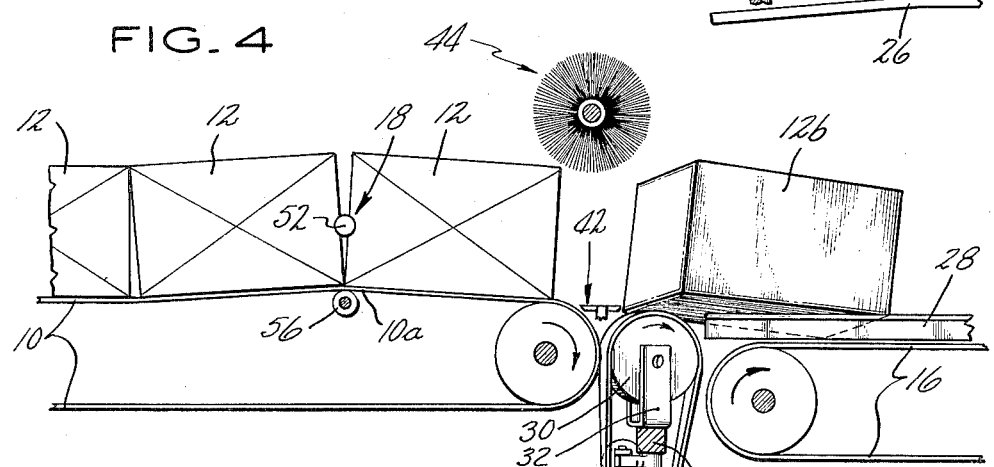
FIG. 4 is a side view of the FIG. 3 apparatus taken at the time of the view of FIG. 3.

The take-away conveyor 16 is also of conventional construction and side guide rails 26, 26 thereon together with a center rail 28 define two lanes, A and B, for accommodating two lines of cartons as shown in FIGS. 1 and 3. As best shown in FIGS. 3 and 4, the center rail 28 is designed to engage the underside of the carton 12b which is being diverted so that this carton will be properly guided into one or the other of the said lanes. The upper surface of the take-away conveyor 16 is below the level of the delivery conveyor 10 and below the carton engaging portion of the diverting means 14 for a purpose to be discussed.

Preferably and as shown, the said means 14 for diverting cartons into one or the other of these lanes comprises a driven wheel 30 supported for rotation in a vertical plane by an upright fork member 32. The wheel 30 is driven by a belt 34 which is entrained on the wheel and on a pulley 36 mounted on the drive shaft of an electric motor 38. As shown, the belt 34 is peripherally received on the wheel 30 so that the frictional material from which the belt is made, or more particularly that portion which is entrained on the wheel 30, will engage the cartons being diverted. It will be apparent however, that the wheel 30 could be dirven by other means, for example, the belt might be connected to a flange on the wheel and in this event the periphery of the wheel could be provided with an annular rim of frictional material for engaging the cartons without departing from the scope of the present invention. It is desirable that the frictional material referred to herein be characterized by a relatively high coefficient of friction in order to optimize the advantages of the present invention. This wheel 30 is preferably driven somewhat faster than the delivery conveyor 10 for a purpose to be discussed hereinbelow. The fork member 32 is pivotally supported for rotation about a fixed vertical axis defined in a fixed cross member 40. As so arranged, the fork 32 is movable between a first position (FIGS. 1 and 2) and a second position (FIGS. 3 and 4) in which positions cartons can be diverted into lanes A and B, respectively, by the driven wheel 30 which moves with the fork 32 as shown. It will be appreciated that these angular positions of the fork member 32 may have to be optimized for a particular carton size or weight and accordingly adjustable stop means (not shown) may be provided for this purpose in the carton diverting means 14. A narrow deadplate, indicated generally at 42, is disposed between the downstream end of the delivery conveyor 10 and the wheel 30 to support each carton as it is engaged by the wheel 30. Preferably and as shown, the deadplate is much narrower than the delivery conveyor 10 and is generally contered with respect thereto as well as aligned with the vertical axis of rotation of the fork member 32. With this construction, carton 12a can be turned as shown in FIG. 1 by the action of the moving wheel 30, whereby it is guided, or aimed, towards lane A on the take-away conveyor 16. Similarly, the carton 12b can be guided toward lane B with the wheel turned as shown in FIG. 3.

A free wheeling nylon bristle brush assembly 44 is provided above the carton and is located to prevent the carton being turned from tipping off the narrow deadplate 42. It has been found that relatively light weight cartons are apt to be lifted slightly by the action of the wheel 30, and the nylon brush assembly functions as an anti-bounce means in that it urges the cartons downwardly against the wheel 30 and against the deadplate 42.

In further accord with the present invention, a carton detecting means 18 is operatively associated with means for moving the said fork 32 and its associated wheel 30 from and to said first and second positions. As shown, said last mentioned means comprises a double acting fluid motor 46 having a piston rod connected to the fork member 32 by a crank arm 48. The said motor 46 is controlled by solenoid valves to be described hereinbelow. The piston is air driven from one or the other of its two sides by a source of air under pressure selectively connectible to the cylinder by the said valves. While other more elaborate timing devices might be employed, it has been found that this oscillatory motion of the fork member 32 can best be synchronized with the continuously advancing line of cartons by judiciously locating the carton detecting means 18 on the delivery conveyor 10. The said means 18 is preferably adjustable longitudinally of the delivery conveyor 10 to permit the apparatus of the present invention to be set up for use with a delivery conveyor which is slower or faster than the conveyor shown. The size of the cartons to be diverted may also require some adjustment of the longitudinal position of the detecting means 18 and in this vein, it should be noted that the apparatus shown can be set up to operate with the cartons 12, 12 spaced apart by some predetermined amount, the line of cartons on the delivery conveyor being shown in end-abutting relationship to bring out an important feature of this apparatus to be discussed in greater detail hereinbelow.

Figure 5:
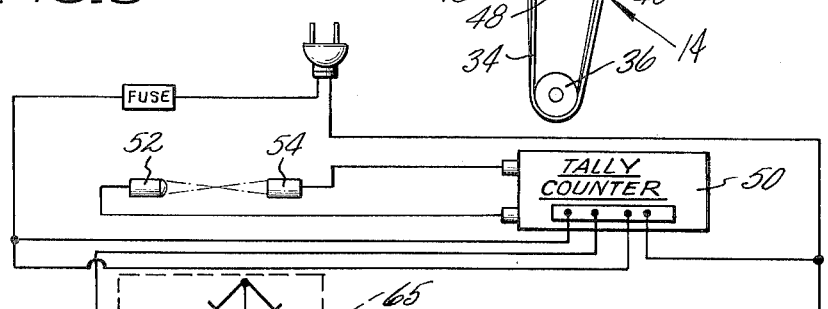
FIG. 5 is a schematic wiring diagram of the control circuitry used in the FIG. 1 apparatus.

The carton detecting means 18 comprises a photosensitive tube 52 mounted at one side of the delivery conveyor 10 and a directional, light source 54 which is similarly mounted at the other side of the conveyor 10 and aligned with the tube 52 for transmitting a light beam to the sensitive portion of the tube. As so arranged the tube 52 will generate a continuous signal to a tally counter 50 (FIG. 5) except when the light beam is interrupted by the presence of a carton on the conveyor 10. It will be apparent that the rectangularly shaped cartons shown would continuously block this light beam if the said cartons were arranged in end-toward-end abutting relationship on a conventional conveyor. Accordingly, in the construction shown, the upper run of the conveyor belt 10a is raised some distance above the horizontal plane of the major portion of the belt 10 by suitable hump means indicated generally at 56 in FIG. 4. As there shown said hump means comprises a roller which is generally aligned with the light source 54 and its associated tube 52 so that a light beam generated by the former will reach the latter between two abutting cartons passing this particular point on the delivery conveyor 10. It will be apparent that said hump means 56 could be otherwise constructed, for example, one or more wedge-shaped ramps might be employed in place of this roller to separate the abutting cartons without departing from the scope of the subject invention.

The tally counter 50 contains means for amplifying the signal from the tube 52 and for storing the number of such signals so received. Conventional signal storing means are provided in the form of a stepping switch 65 having a pair of contacts 64 and 66 which are actuated whenever a first predetermined number of such phototube signals have been received. A holding relay (not shown) holds these contacts until a second predetermined number of such signals have been stored therein at which time these contacts are actuated in reverse and restored to the normal condition shown.

As mentioned, air under pressure is selectively connected to one or the other sides of the motor 46 to drive the piston rod to one or the other of its two positions corresponding to the two diverter positions described hereinabove. Two solenoids 60 and 62 (FIG. 5) control the valve operating the cylinder 46. The former solenoid 60 is controlled by the normally open stepping switch contacts 64 so that the valve associated therewith does not admit air under pressure to that side of the cylinder until said first predetermined number of cartons have passed the detecting means 18. The other solenoid 62 is controlled by the normally closed stepping switch contacts 66 so that this valve admits air under pressure to the other side of the cylinder until said first predetermined number of cartons have passed the means 18.

Turning now to the operation of the abovedescribed apparatus, a single line of cartons 12, 12 is shown in FIGS. 1–4 being fed along the conveyor 10 in end-abutting relationship. As each carton passes the detecting means 18 it is lifted slightly by hump means 56 so that a photocell can produce a signal corresponding to each carton conveyed therepast. These signals are stored in the tally counter 50 where a stepping switch 65 periodically actuates a pair of solenoids 60 and 62. These solenoids 60 and 62 are oppositely operated in unison to admit air to the appropriate side of the pneumatic motor 46 so that the wheel 30 can be pivoted between said first and second positions. As shown in FIGS. 1 and 2, the wheel is in position for diverting cartons into lane A and the carton 12a is supported on the deadplate 42. The wheel 30 has started to accelerate this carton 12a away from the next following carton and to turn it toward the proper lane on the take-away conveyor 16. This movement is readily apparent from the space between the carton 12a and the next following carton on the delivery conveyor 10. The function of the free wheeling brush 44 has been adequately described hereinabove and will not be repeated here.

FIGS. 3 and 4 show the wheel 30 after it has been pivoted into its second position wherein the carton 12b is being turned into lane B on take-away conveyor 16. As the carton 12b is moved onto the take-away conveyor 16, the center guide rail 28 engages the underside of the carton as mentioned hereinabove. The leading outermost corner of the carton 12b tips downwardly as the carton is further advanced by the wheel 30, and as shown the take-away conveyor 16 is located below the level of the wheel 30 and the deadplate 42 in order to permit the carton to be so turned as shown before its outermost corner is engaged by the take-away conveyor 16.

As the carton is carried away by the take-way conveyor 16, it will be rotated towards the downstream direction by the action of the moving conveyor 16 and the stationary center guide rail 28. The rail 28 thus contributes to the diverting function of the belt driven wheel 30 in that it helps to divert the cartons into two distinct lanes on the take-away conveyor 16. The cross sectional shape of this rail 28 varies along its length to increase its effectiveness as best revealed in FIG. 1.

Finally, as brought out hereinabove with reference to the tally counter 50, the wheel 30 is moved successively between a plurality of angular positions in response to the opening and closing of stepping switch contacts 64 and 66. The stepping switch itself can be preset in accordance with a given schedule whereby predetermined numbers of cartons can be fed into the lanes on the take-away conveyor 16.

The invention claimed is:

1. An apparatus for diverting articles from a single line of abutting articles into a plurality of lines, said apparatus comprising a delivery conveyor for advancing said articles therealong in end abutting relationship, hump means at a particular point on said delivery conveyor for separating two adjacent abutting articles as they pass said point, article detecting means responsive to the momentary separation between said adjacent articles for producing a signal corresponding to each article conveyed past said point, article diverting means downstream of said delivery conveyor and pivotable about an axis normal to the plane of said delivery conveyor for movement between a plurality of angular positions, said article diverting means having an article engaging portion for frictionally engaging each article delivered thereto for accelerating the same off said delivery conveyor, means responsive to predetermined numbers of said article signals for successively moving said article diverting means from one to another of said angular positions, and means for conveying said articles away from said pivotable diverting means in a plurality of lanes corresponding in number to said plurality of angular positions of said article diverting means.

2. An apparatus as set forth in claim 1 wherein said article diverting means comprises at least one wheel, and wherein said article engaging portion thereof comprises the peripheral portion of said wheel means for driving said wheel at a peripheral speed which is greater than the lineal speed of the advancing articles on said delivery conveyor, and fork means rotatably supporting said wheel so that said peripheral portion engages the underside of each article delivered thereto, said fork means being pivotably supported on said normal axis for angularly positioning said wheel.

3. An apparatus as set forth in claim 2 wherein said article diverting means further comprise a narrow deadplate between the downstream end of said delivery conveyor and said driven wheel, said deadplate being generally aligned with said normal axis of said fork means to help support an article as it is being diverted.

4. An apparatus for diverting articles from a single line of abutting articles into two lines, said apparatus comprising a delivery conveyor for advancing said articles therealong in end abutting relationship, hump means at a particular point on said delivery conveyor for separating two adjacent abutting articles as they pass said point, a light source above and to one side of said delivery conveyor and adjacent said hump means, photosensitive article detecting means opposite said light source and laterally aligned therewith for producing a signal corresponding to each article conveyed past said point on said delivery conveyor, a driven wheel having a peripheral speed somewhat greater than the lineal speed of the advancing articles on said delivery conveyor, a fork member rotatably supporting said wheel so that the wheel engages the underside of each article delivered thereto, means for moving said fork means between first and second positions about an axis normal to the plane of said delivery conveyor, switching means responsive to predetermined numbers of said article signals for causing said lastmentioned means to operate in successively opposite directions, a take-away conveyor downstream of said driven wheel, and means for conveying articles away from said wheel in two lanes corresponding to said first and second positions of said fork member and its associated wheel.

5. An apparatus as set forth in claim 4 wherein said means for conveying articles away from said wheel comprises at least one take-away conveyor the surface of which is below the article engaging portion of said wheel, two side guide rails adjacent the marginal side edges of said take-away conveyor, a center guide rail between said side rails and defining two parallel lanes for said articles, and an upstream portion of said center rail which is adapted to engage the underside of each article being fed thereto by said wheel to guide the same into one or the other of the said lanes.

6. An apparatus as set forth in claim 4 further characterized by a narrow deadplate between the downstream end of said delivery conveyor and said driven wheel, said deadplate being generally aligned with the normal axis of rotation of said fork member to help support an article being engaged by said wheel.

7. An apparatus as set forth in claim 6 further characterized by anti-bounce means located generally vertically above said deadplate for steadying the article as it comes in contact with said driven wheel.

8. An apparatus for diverting articles from a single line of abutting articles into two lines, said apparatus comprising a delivery conveyor for advancing said articles therealong in end-abutting relationship, hump means at a preselected point on said delivery conveyor for separating two adjacent abutting articles as they pass said point, article detecting means responsive to the momentary separation between said adjacent articles for producing a signal corresponding to each article conveyed past said point, an article diverting wheel, a belt of frictional material peripherally entrained on said wheel and driven at a lineal speed which is greater than the lineal speed of the advancing articles on said delivery conveyor, a fork member rotatably supporting said wheel so that a portion of said belt which is entrained on said wheel engages the underside of each article delivered thereto, means for moving said fork member between first and second angularly related positions about an axis normal to the plane of said delivery conveyor, means responsive to predetermined numbers of said article signals for causing said last mentioned means to operate in successively opposite directions, a take-away conveyor downstream of said article diverting wheel and means defining two lanes on said take-away conveyor to convey articles away from said wheel.

References Cited by the Examiner

UNITED STATES PATENTS

| | | | |
|---|---|---|---|
| 2,566,417 | 9/1951 | Holm | 198—31 |
| 2,847,107 | 8/1958 | Pennington | 198—31 |
| 3,008,564 | 11/1961 | Lakso | 198—31 |

SAMUEL F. COLEMAN, *Primary Examiner.*

WILLIAM B. LA BORDE, *Examiner.*